United States Patent [19]

Weinich et al.

[11] Patent Number: 4,674,796

[45] Date of Patent: Jun. 23, 1987

[54] VEHICLE PASSENGER HEADREST SUPPORT ARRANGEMENT

[75] Inventors: Manfred Weinich, Gechingen; Hermann Gross, Magstadt; Herbert Rapp, Sindelfingen, all of Fed. Rep. of Germany

[73] Assignee: Daimler-Benz Aktiengesellschaft, Fed. Rep. of Germany

[21] Appl. No.: 784,051

[22] Filed: Oct. 4, 1985

[30] Foreign Application Priority Data

Oct. 5, 1984 [DE] Fed. Rep. of Germany ....... 3436540

[51] Int. Cl.[4] .............................................. A47C 7/36
[52] U.S. Cl. .................................... 297/391; 297/410
[58] Field of Search ................ 297/410, 391; 403/109, 403/327, 325; 248/408, 409

[56] References Cited

U.S. PATENT DOCUMENTS

| 1,977,159 | 10/1934 | Tursi | 297/410 |
| 2,563,951 | 8/1951 | Mondy | 248/408 X |
| 3,462,193 | 8/1969 | Tamura | 297/410 |
| 3,498,672 | 3/1970 | Leichtl | 297/410 |
| 3,542,429 | 11/1970 | Inoue | 248/408 X |
| 3,635,527 | 1/1972 | Weber | 297/410 |
| 3,886,962 | 6/1975 | Diamontis | 403/327 |
| 4,456,285 | 6/1984 | Weber-Henning | 403/109 |

FOREIGN PATENT DOCUMENTS 2138078 2/1973 Fed. Rep. of Germany .

Primary Examiner—Francis K. Zugel
Attorney, Agent, or Firm—Barnes & Thornburg

[57] ABSTRACT

In the case of a headrest provided with an arrangement for securing the end position of a support rod, where the catch effect for the removal of the headrest with both hands can be temporarily cancelled, and the catch, when the support rod is pushed in, is automatically brought back into the position where it is ready to catch, a two-armed lever is disposed at the lower end of an operating rod which takes up two defined end positions. In one end position, the free end of the lever is swivelled out of the path of motion of the support rod and the catch is in effect whereas in the other end position, the catch effect is cancelled and the free end is swivelled into the path of motion of the support rod.

6 Claims, 3 Drawing Figures

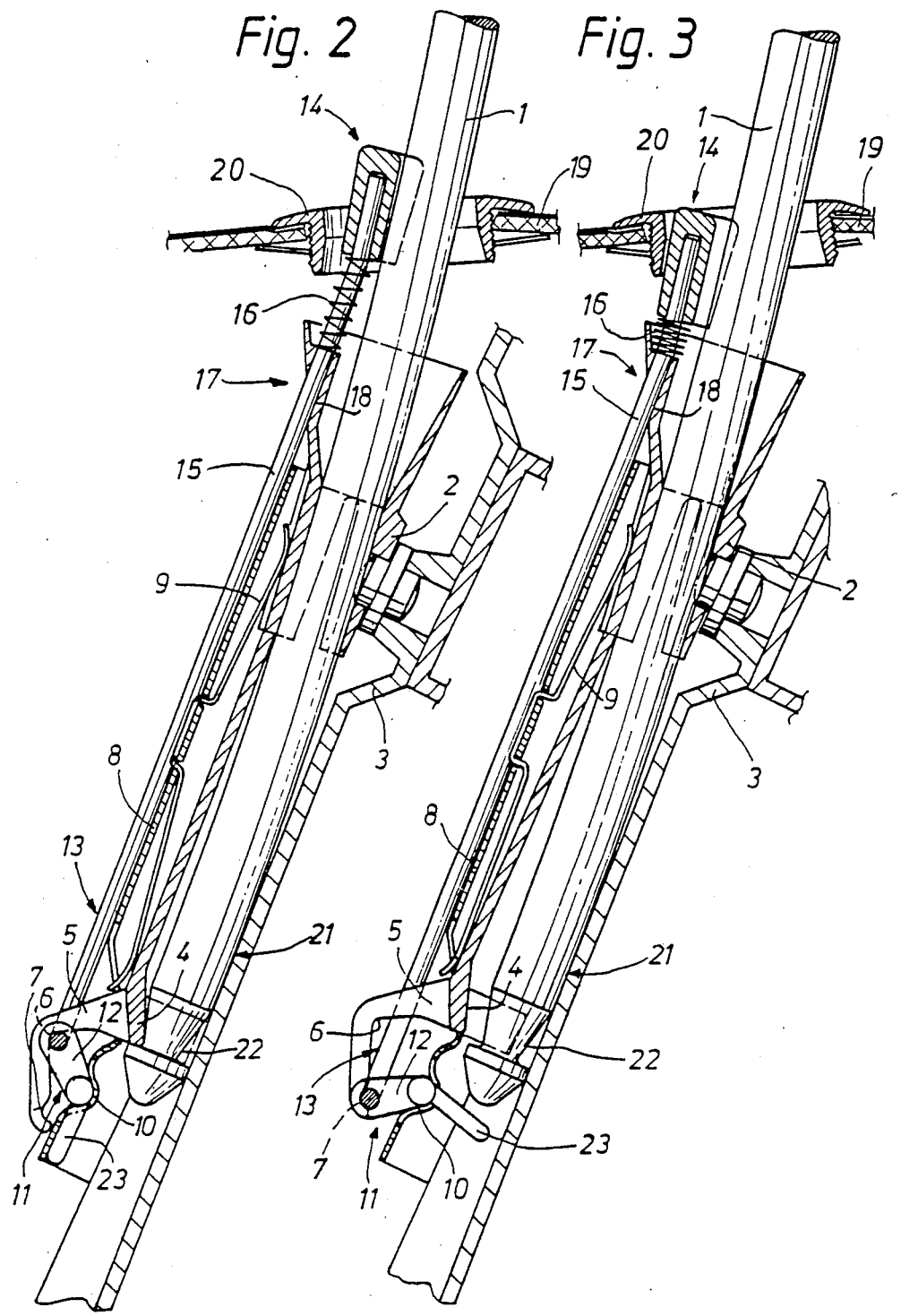

4,674,796

VEHICLE PASSENGER HEADREST SUPPORT ARRANGEMENT

BACKGROUND AND SUMMARY OF THE INVENTION

This application is related to commonly assigned application Ser. No. 784,108, filed on even date herewith and based on German Priority Application No. P 34 36 541.9, filed in Germany on Oct. 5, 1984.

The present invention relates to an improved apparatus for releasably holding a vehicle passenger headrest at a vehicle seatback or the like. Preferred embodiments of the invention relate to an arrangement for securing the end position of a guided support rod of a headrest, wherein a recess is provided at the free end of said support rod into which a spring-loaded catch engages when the maximum pull-out length of the headrest is reached, this catch being releasable via a remote control device extending from the upper side of the backrest. The remote control includes an operating rod extending approximately in axial direction of the support rod, the operation of said operating rod guiding said catch into a secured disengaged position which, when the support rod is pushed in again, is cancelled by its effect, according to the above-identified copending commonly owned application.

An arrangement for securing the end position that is constructed in such a way that it can temporarily be cancelled has the advantage that, when necessary, the headrest can be removed easily with both hands when the securing is cancelled, and that, when the headrest is used again, the securing effect starts again automatically.

It is an objective of the invention to provide a development of the arrangement for securing the end position that is easy to operate and suitable for large-series production while maintaining the described advantages.

This objective is achieved by providing an arrangement with a mechanism which includes a locking device for locking the headrest against inadvertent withdrawal and a release device which automatically renders the locking device effective and ineffective in response to movement of the headrest.

In an advantageous development of the preferred embodiments of the invention, the upper end of the operating rod means, in a bearing shaped onto the headrest guiding means, projecting through an eye sunk into the upper side of the backrest for the penetration of the support rod, is guided approximately in parallel to the support rod.

A simple construction is achieved when the catch is connected with the headrest guiding means in one piece.

Further objects, features, and advantages of the present invention will become more apparent from the following description when taken with the accompanying drawings(s) which show, for purposes of illustration only, an embodiment constructed in accordance with the present invention.

BRIEF DESCRIPTION OF THE DRAWINGS

FIG. 2 is a view similar to FIG. 1 showing the arrangement when the parts in the locked, end position of the support rod is in effect;

FIG. 3 is a view similar to FIGS. 1 and 2, showing the operating release rod pressed in and the catch swivelled away.

DETAILED DESCRIPTION OF THE DRAWINGS

Figure 1:
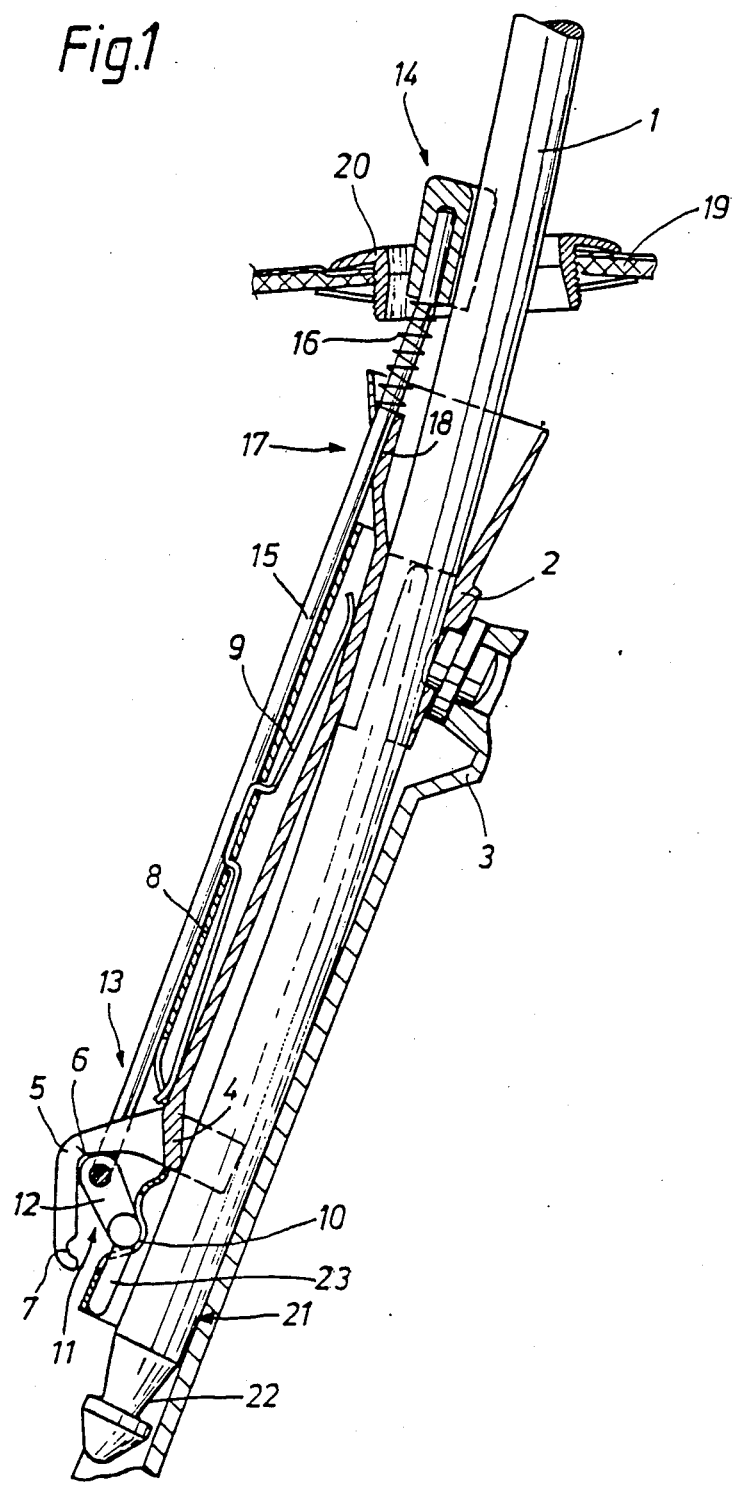
FIG. 1 is a part sectional schematic side view of an arrangement for securing the end position of a support rod of a headrest having a catch that supports itself at the shaft of the support rod, constructed in accordance with a preferred embodiment of the invention.

As shown in FIG. 1, a support rod means 1 of a continuously vertically movably adjustable headrest (headrest not shown but attached to the support rod 1) is received by a headrest guiding tube 2 which supports itself at a frame 3 of the backrest and at its lower end tapers off into a catch 4 which has an extension with a cam guide surface 5 that has two distinctive end positions 6 and 7. The headrest guiding means 2 is surrounded by a closing part 8 fixed at the frame 3 of the backrest, this closing part 8 receiving a spring 9 that acts upon the headrest guiding means 2. On the bottom side of the closing part 8, a bearing 10 is formed for accommodating a two-armed lever 11. A remote control system 14 includes in part, one arm 12 of said lever 11 pivotably connected with the lower end 13 of an operating rod 15. A spring 16 is assigned to said operating rod 15 in order to prevent noise. The upper end 17 of the operating rod 15 is received by a bearing 18 of the headrest guiding tube 2 and penetrates through an eye 20 sunk into the upper side of a seat backrest 19, the eye 20 also receiving the support rod 1. The support rod 1 is provided with a recess 22 at its free end 21.

In the pushed-in position of the support rod 1 according to FIG. 1, the catch 4 supports itself at the shaft of the support rod 1 such that said support rod can be moved freely upward and downward. The operating rod 15 is in its upper position, and the one arm 12 of the two-armed lever 11 is in the end position 6 of the cam guide surface 5, while the second arm 23 rests against the closing part 8 on the inside, out of the path of the support rod.

When the support rod 1 is pulled completely upward, as shown in FIG. 2, the spring-loaded catch 4 enters the recess 22 and thus limits the pull-out movement. This locking mechanism includes a spring 9 biasing a catch 4 having an extension with a cam guide surface 5. When the operating rod 15 positions the arm 12 of the two armed lever 11 in the end position 6 on the cam guide surface 5 the catch 4 is biased against the shaft of the support rod 1. In the end position of the rod 1, the catch 4 engages the recess 22 of the support rod 1, locking the rod in place. It is only when the operating rod 15 is pressed downward, as shown in FIG. 3, that the two-armed lever 11 is reversed and its one arm 12 will now enter the end position 7 of the cam guide surface 5 and the other arm 23 will swivel into the path of motion of the support rod 1. In the case of this sequence of movements, the catch 4 is swivelled out of the recess 22 so that the support rod 1 is pulled out in upward direction and the headrest can therefore be removed. This release mechanism includes a spring-biased 16 operating rod 15 which is pushed in, causing the arm 12 to enter the end position 7 of the cam guide surface, thereby causing the catch 4 to move out of the recess 22.

When the support rod 1 is moved in again, it knocks with its free end 21 against the second arm 23 of the lever 11 and causes its reversal so that, when the support rod 11 is moved further downward, the starting position shown in FIG. 1 is re-established. This rod 1 and the arm 23 of the lever 11 which is swivelled away upon reinsertion of the rod 1 comprises a triggering means since it re-establishes the starting (locking) position shown in FIGS. 1 and 2.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An arrangement for securing the position of a support rod means for a vehicle headrest, including locking means for preventing an unintentional manual removal of said headrest support rod from a support by an operator, and release means for disengaging said locking means to permit removal of said headrest, said release means being configured such that an external manual force is unnecessary to maintain said locking means in its disengaged state whereby said headrest may be removed with both hands by the operator using a minimal force, wherein said release means includes an operating rod which at its lower end pivotally receives one arm of a two-armed lever projecting from a catch and pivoted at a bearing on a stationary closing part surrounding a headrest rod guiding means, and an extension of the catch with a cam guide surface having defined upper and lower end positions for the reception of said one arm of said two arm lever, said release means so constructed that when the operating rod is moved downward against the force of a spring, the one arm of said lever is guided into the lower end position of said surface, and at the same time, the catch is lifted off a recess of the support rod allowing removal of said headrest and the second arm of said lever is swivelled into the path which the support rod takes upon reinsertion of said rod into said support.

2. An arrangement for a headrest according to claim 1, wherein said locking means is automatically triggered upon reinsertion of said support rod means, wherein as said support rod means is reinserted, it contacts and pushes down the second arm such that the one arm is swivelled into the upper end position, and at the same time, the catch moves into recess of the support rod means.

3. An arrangement for a headrest according to claim 1, wherein the upper end of the operating rod, is fixed by bearing means onto the headrest guiding means, such that it is guided approximately in parallel to the axis of the support rod.

4. An arrangement for a headrest according to claim 1, wherein the catch is connected in one piece with the headrest guiding means.

5. An arrangement for securing the position of a support rod means in a support for a vehicle headrest including:

locking means for preventing an unintentional removal of said headrest by an operator, release means for disengaging said locking means, to permit removal of said headrest and triggering means which automatically resets the locking means upon reinsertion of said headrest in said support, said triggering means including lever means for transmitting forces from the support rod means to the release means.

6. An arrangement according to claim 5, wherein the triggering means includes an arrangement of a two-armed lever.

* * * * *